United States Patent
Lee

(10) Patent No.: US 10,267,411 B2
(45) Date of Patent: Apr. 23, 2019

(54) HYDRAULIC CIRCUIT FOR TRANSMISSION

(71) Applicants: HYUNDAI MOTOR COMPANY, Seoul (KR); KIA MOTORS CORPORATION, Seoul (KR)

(72) Inventor: June Ho Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 13 days.

(21) Appl. No.: 15/814,911

(22) Filed: Nov. 16, 2017

(65) Prior Publication Data

US 2018/0340608 A1 Nov. 29, 2018

(30) Foreign Application Priority Data

May 26, 2017 (KR) .................. 10-2017-0065537

(51) Int. Cl.
*F16H 61/00* (2006.01)
*F16H 61/02* (2006.01)

(52) U.S. Cl.
CPC ..... *F16H 61/0206* (2013.01); *F16H 61/0009* (2013.01); *F16H 61/0025* (2013.01); *F16H 2061/0258* (2013.01)

(58) Field of Classification Search
CPC ............. F16H 61/0009; F16H 61/0025; F16H 61/0206; F16H 2061/0258
USPC ....................... 475/127, 128, 140
See application file for complete search history.

(56) References Cited

U.S. PATENT DOCUMENTS

| 6,761,664 | B2 |   | 7/2004 | Ayabe et al. |
| 7,559,866 | B2 | * | 7/2009 | Kondoh ............... F16H 61/0206 475/127 |
| 7,568,990 | B2 | * | 8/2009 | Sah ........................ B60K 6/365 475/117 |
| 7,869,924 | B2 | * | 1/2011 | Wu ........................ B60W 20/50 701/51 |
| 9,154,060 | B2 |   | 10/2015 | Noguchi et al. |
| 9,777,829 | B2 | * | 10/2017 | Turner .................... F16H 59/02 |
| 2003/0022756 | A1 |   | 1/2003 | Ayabe et al. |
| 2008/0047799 | A1 | * | 2/2008 | Combes ................ B60K 6/387 192/58.5 |

(Continued)

FOREIGN PATENT DOCUMENTS

KR  10-0309332 B1  9/2001
KR  10-0459744 B1  12/2004

*Primary Examiner* — Leslie A Nicholson, III
(74) *Attorney, Agent, or Firm* — Morgan Lewis & Bockius LLP

(57) ABSTRACT

A hydraulic circuit for a transmission includes a friction element that engages or disengages an operating element of the transmission, a pump that pumps oil to form preliminary pressure that allows the friction element to be maintained in a standby state in which the friction element is ready to operate, and a direct control valve that receives the oil that has passed through the pump and adjusts the preliminary pressure to form operating pressure that allows the friction element to operate, when operating the friction element. The friction element includes a hydraulic chamber into which the oil is introduced, a first supply hole through which the oil that has passed through the pump is supplied to the hydraulic chamber, and a second supply hole through which the oil that has passed through the direct control valve is supplied to the hydraulic chamber.

11 Claims, 5 Drawing Sheets

(56) References Cited

U.S. PATENT DOCUMENTS

2015/0219209 A1\* 8/2015 Turner .................... F16H 59/02
                                                                               74/473.11
2017/0335952 A1\* 11/2017 Fukuda ............... F16H 61/0206
2017/0363202 A1\* 12/2017 Turner .................... F16H 59/02

\* cited by examiner

HYDRAULIC CIRCUIT FOR TRANSMISSION

CROSS-REFERENCE TO RELATED APPLICATION

This application is based on and claims the benefit of priority to Korean Patent Application No. 10-2017-0065537, filed on May 26, 2017, in the Korean Intellectual Property Office, the disclosure of which is incorporated herein in its entirety by reference.

TECHNICAL FIELD

The present disclosure relates to a hydraulic circuit for a transmission.

BACKGROUND

An automatic transmission for a vehicle automatically converts power generated from a prime mover (such as an engine, an electric motor, or the like) into torque and rotational speeds in RPM that are appropriate for facilitating the driving of the vehicle.

The automatic transmission includes: a torque converter to which the power of the prime mover is supplied; a plurality of operating elements capable of converting the power supplied through the torque converter into torque and rotational speeds in RPM appropriate for driving the vehicle; a plurality of friction elements that engage or disengage rotations of operating elements to implement a plurality of shifting stages; a hydraulic circuit that selectively operates the friction elements by using hydraulic pressure; and a control unit that controls the overall operation of the automatic transmission to selectively adjust the shifting stages depending on a driving state of the vehicle.

A hydraulic circuit for a transmission in the related art may supply oil to at least one of friction elements at a predetermined hydraulic pressure to selectively operate at least one of the friction elements.

To this end, the hydraulic circuit for a transmission in the related art may include: a pump that pumps oil stored in an oil pan; a regulator valve that forms line pressure by adjusting the pressure of the oil pumped by the pump; a reducing valve that receives the oil that has passed through the regulator valve and reduces the line pressure to form reducing pressure; a line solenoid valve that controls the regulator valve by using the reducing pressure; and a proportional control solenoid valve that receives the oil that has passed through the regulator valve and fouls control pressure to selectively control one of the friction elements.

Since the hydraulic circuit for a transmission in the related art controls the friction elements by using the plurality of valves, as described above, the hydraulic circuit has a complex circuit structure. Due to this, the hydraulic circuit for a transmission in the related art has problems in terms of high installation cost and high flow loss.

SUMMARY

The present disclosure has been made to solve the above-mentioned problems occurring in the related art while advantages achieved by the related art are maintained intact.

An aspect of the present disclosure provides a hydraulic circuit for a transmission, the hydraulic circuit having a structure improved to simplify the circuit structure thereof.

Another aspect of the present disclosure provides a hydraulic circuit for a transmission, the hydraulic circuit having an improved structure to rapidly operate a friction element.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hydraulic circuit for a transmission may include a friction element configured to engage or disengage an operating element of the transmission, a pump configured to pump oil to form preliminary pressure that allows the friction element to be maintained in a standby state in which the friction element is ready to operate, and a direct control valve configured to receive the oil that has passed through the pump and to adjust the preliminary pressure to form operating pressure that allows the friction element to operate, when operating the friction element. The friction element may include a hydraulic chamber into which the oil is introduced, a first supply hole through which the oil that has passed through the pump is supplied to the hydraulic chamber, and a second supply hole through which the oil that has passed through the direct control valve is supplied to the hydraulic chamber.

According to an embodiment, the hydraulic circuit may further include a hydraulic line configured to supply, to the friction element, the oil that has passed through the pump and the oil that has passed through the direct control valve. The hydraulic line may include a first hydraulic line connecting the pump and the first supply hole, a second hydraulic line configured to deliver the oil that has passed through the friction element to the direct control valve, and a third hydraulic line connecting the direct control valve and the second supply hole.

According to an embodiment, the friction element may further include a drain hole through which the oil introduced into the hydraulic chamber is drained from the hydraulic chamber. The second hydraulic line may connect the drain hole and the direct control valve.

According to an embodiment, the hydraulic circuit may further include a relief valve placed on the third hydraulic line to restrict the operating pressure such that the operating pressure becomes lower than a maximum allowable pressure determined in advance.

According to an embodiment, the hydraulic circuit may further include a hydraulic line configured to supply, to the friction element, the oil that has passed through the pump and the oil that has passed through the direct control valve. The hydraulic line may include a first hydraulic line connecting the pump and the first supply hole, a second hydraulic line configured to deliver the oil that has passed through the pump to the direct control valve, and a third hydraulic line connecting the direct control valve and the second supply hole.

According to an embodiment, the second hydraulic line may connect the first hydraulic line and the direct control valve.

According to an embodiment, the hydraulic circuit may further include a controller configured to control driving of the pump and the direct control valve. The controller may close the direct control valve when allowing the friction element to stand ready for operation and may open the direct control valve to a predetermined opening degree when operating the friction element.

According to an embodiment, the hydraulic circuit may further include a pressure sensor configured to measure the operating pressure. The controller may adjust at least one of an RPM of the pump and a degree to which the direct control valve is open, based on a pressure value measured by the pressure sensor.

According to an embodiment, the direct control valve may be a proportional control solenoid valve configured to linearly control the operating pressure.

According to an embodiment, the pump may be an electric oil pump.

According to an embodiment, the friction element may be either an overdrive clutch or an overdrive brake.

The hydraulic circuit for a transmission, according to the present disclosure, has the following effects:

First, the hydraulic circuit for a transmission according to the present disclosure may reduce the number of valves required to operate a friction element, compared to a hydraulic circuit for a transmission in the related art, and may thus reduce the amount of oil supplied by a pump, valve installation cost, flow loss, and the like.

Second, the hydraulic circuit for a transmission according to the present disclosure may rapidly operate a friction element since the hydraulic circuit may maintain the friction element in a standby state in which the friction element is ready to operate.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
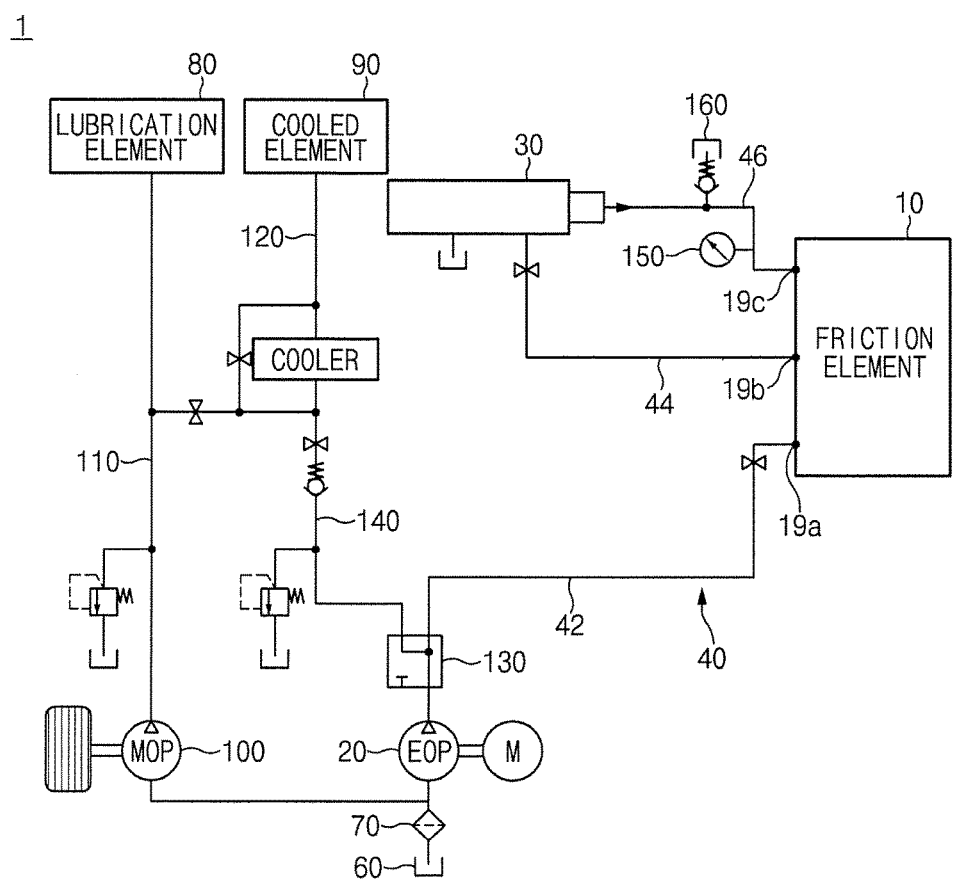
FIG. 1 is a schematic view illustrating a configuration of a hydraulic circuit for a transmission according to a first embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

Terms, such as "first", "second", "A", "B", "(a)", "(b)", and the like, may be used herein to describe elements of the present disclosure. Such terms are only used to distinguish one element from another element, and the substance, sequence, order, or number of these elements is not limited by these teams. Unless otherwise defined, all terms used herein, including technical and scientific terms, have the same meaning as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
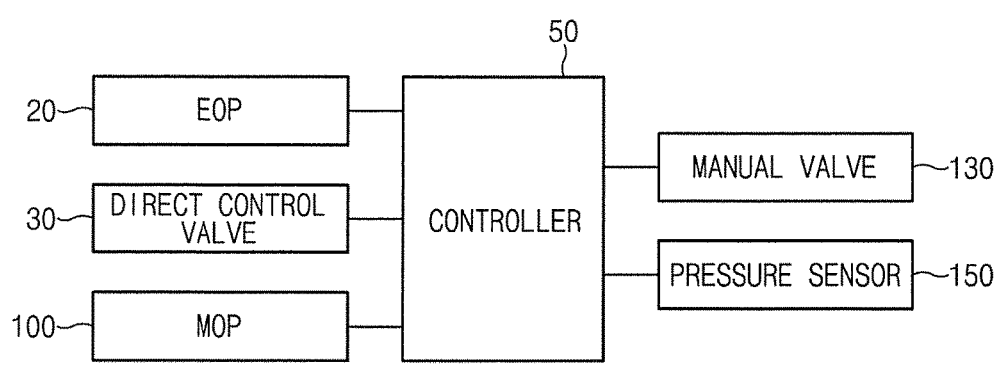
FIG. 2 is a block diagram for explaining a control system of the hydraulic circuit illustrated in FIG. 1.
Figure 3:
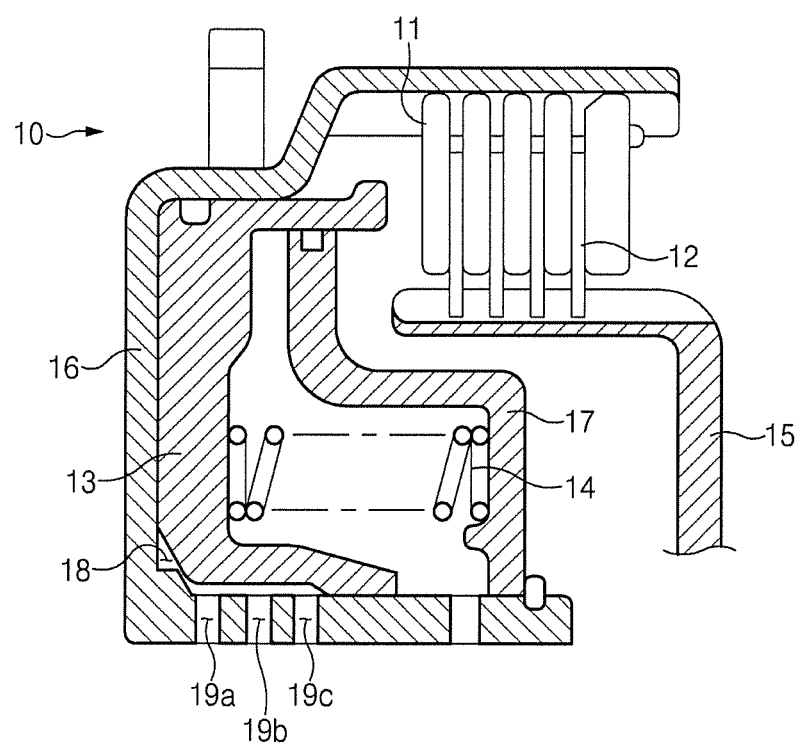
FIG. 3 is a schematic view illustrating a configuration of a friction element illustrated in FIG. 1.

FIG. 1 is a schematic view illustrating a configuration of a hydraulic circuit for a transmission according to a first embodiment of the present disclosure. FIG. 2 is a block diagram for explaining a control system of the hydraulic circuit illustrated in FIG. 1. FIG. 3 is a schematic view illustrating a configuration of a friction element illustrated in FIG. 1.

A hydraulic circuit 1 for a transmission, according to the first embodiment of the present disclosure, is a device for supplying hydraulic pressure to a friction element 10 of an automatic transmission of a vehicle. The hydraulic circuit 1 for a transmission is applicable to all types of vehicles without any specific limitation. For example, the hydraulic circuit 1 for a transmission may be applied to a hybrid electric vehicle driven by power supplied from an engine and an electric motor. Hereinafter, a description of the hydraulic circuit 1 for a transmission will be given, assuming that the hydraulic circuit 1 for a transmission is applied to a hybrid electric vehicle.

Referring to FIGS. 1 to 3, the hydraulic circuit 1 for a transmission may include the friction element 10, a pump 20, a direct control valve 30, a hydraulic line 40, a controller 50, and the like.

The controller 50 is an electric circuitry that executes instructions of software which thereby performs various functions described hereinafter.

The friction element 10 may be either a clutch or a brake that may engage or disengage an operating element included in a planetary gear set of the automatic transmission of the vehicle. For example, the friction element 10 may be either an overdrive clutch or an overdrive brake. For the convenience of description, a description of the hydraulic circuit 1 for a transmission will hereinafter be given with a clutch as an example of the friction element 10.

The friction element 10 may include clutch plates 11, clutch discs 12, a piston 13, a return spring 14, and the like, as illustrated in FIG. 3.

The clutch plates 11 may be arranged with a predetermined interval therebetween. The clutch plates 11 may be coupled with a clutch retainer 16 and may be connected to an input shaft (not illustrated) of the automatic transmission of the vehicle. The clutch discs 12 may be arranged with a predetermined interval therebetween to correspond to the clutch plates 11. The clutch discs 12 may be coupled with a clutch hub 15 and may be connected to an output shaft (not illustrated) of the automatic transmission of the vehicle. As illustrated in FIG. 3, the clutch plates 11 and the clutch discs 12 may be alternately arranged with a pre-determined interval therebetween.

The piston 13 may be located to be movable between the clutch retainer 16 and the clutch plates 11. The piston 13 may be supported by a piston retainer 17. As illustrated in FIG. 3, a hydraulic chamber 18 into which oil is introduced may be formed between the piston 13 and the clutch retainer 16.

The friction element 10 may further include a first supply hole 19a, a drain hole 19b, and a second supply hole 19c that are formed through a sidewall of the clutch retainer 16 to be communicatively connected to the hydraulic chamber 18. As illustrated in FIG. 1, the first supply hole 19a may be connected with the pump 20 through a first hydraulic line 42, which will be described below. The drain hole 19b may be connected with an inlet of the direct control valve 30 through a second hydraulic line 44, which will be described below. The second supply hole 19c may be connected with an outlet of the direct control valve 30 through a third hydraulic line 46, which will be described below. Accordingly, oil supplied from the pump 20 and the direct control valve 30 may be introduced into the hydraulic chamber 18 through the first and second supply holes 19a and 19c, respectively. The oil introduced into the hydraulic chamber 18 may be drained from the hydraulic chamber 18 through the drain hole 19b.

As the oil is introduced into, or drained from, the hydraulic chamber 18, a hydraulic pressure may be applied to the hydraulic chamber 18. The hydraulic pressure may be exerted on the piston 13 to move the piston 13 toward the clutch plates 11.

The return spring 14 may be interposed between the piston 13 and the piston retainer 17. The return spring 14 may elastically press the piston 13 in the direction in which the piston 13 moves away from the clutch plates 11. The elastic pressure of the return spring 14 may increase in proportion to the degree to which the return spring 14 is compressed.

As described above, the hydraulic pressure applied to the hydraulic chamber 18 and the elastic pressure of the return spring 14 may be exerted on the piston 13 in opposite directions. Accordingly, a difference between the hydraulic pressure and the elastic pressure may cause the piston 13 to move or stop.

For example, the piston 13 may stop when the hydraulic pressure is equal to the elastic pressure.

For example, when the hydraulic pressure is higher than the elastic pressure, the piston 13 may move toward the clutch plates 11. The piston 13 having moved forward, as described above, may press the clutch plates 11 to allow the clutch plates 11 and the clutch discs 12 to be locked together. The friction element 10 may engage an operating element by allowing the clutch plates 11 and the clutch discs 12 to be locked together.

For example, when the hydraulic pressure is lower than the elastic pressure, the piston 13 may move away from the clutch plates 11. Due to this, the pressure exerted on the clutch plates 11 by the piston 13 may be released, and thus the clutch plates 11 and the clutch discs 12 may be unlocked from one another. The friction element 10 may disengage the operating element by allowing the clutch plates 11 and the clutch discs 12 to be unlocked from one another. Furthermore, the piston 13, which has moved as far as possible from the clutch plates 11, may move backward while being supported by the clutch retainer 16, and at this time, the hydraulic chamber 18 may have a minimum volume.

The pump 20 may pump oil out of an oil pan 60 and may deliver the oil to the first hydraulic line 42. An oil filter 70 may preferably be located between the pump 20 and the oil pan 60 to filter the oil, but the present disclosure is not limited thereto.

The pump 20 may preferably be an electric oil pump driven by power supplied from a high-voltage battery (not illustrated), but the pump 20 is not limited thereto.

The pump 20 may be driven at a predetermined RPM to form preliminary pressure by which the friction element 10 may be maintained in a standby state, in which the friction element is ready to operate: As illustrated in FIG. 2, the controller 50 may control driving of the pump 20 and may adjust the magnitude of the preliminary pressure by adjusting the RPM of the pump 20.

Here, the standby state where the friction element 10 is ready to operate may refer to a state right before the friction element 10 is operated by hydraulic pressure applied to the hydraulic chamber 18. That is, the standby state may refer to a state in which hydraulic pressure and elastic pressure are equal to each other with the piston 13 that has maximally moved backward so as to be supported by the clutch retainer 16. The preliminary pressure may refer to hydraulic pressure when the friction element 10 is in the standby state.

The oil pumped by the pump 20 may be supplied to the first supply hole 19a of the friction element 10 through the first hydraulic line 42 and may be introduced into the hydraulic chamber 18 to apply preliminary pressure to the piston 13, thereby maintaining the friction element 10 in the standby state in which the friction element 10 is ready to operate.

The direct control valve 30 may be configured to: receive the oil, which has passed through the pump 20, via the second hydraulic line 44, which will be described below; adjust the pressure of the oil; and deliver the oil to the third hydraulic line 46, which will be described below.

As illustrated in FIG. 1, the inlet of the direct control valve 30 may be connected with the second hydraulic line 44. The oil introduced into the hydraulic chamber 18 may flow into the second hydraulic line 44 through the drain hole 19b, and the oil that has passed through the second hydraulic line 44 may be delivered to the inlet of the direct control valve 30. That is, the oil that has passed through the pump 20 may be delivered to the inlet of the direct control valve 30 via the hydraulic chamber 18.

The direct control valve 30 may adjust the pressure of the oil delivered thereto. For example, in the case where preliminary pressure is formed by pumping, the direct control valve 30 may adjust the preliminary pressure to foam operating pressure by which the friction element 10 is to be operated. To this end, the direct control valve 30 may be a normally low (N/L) type proportional control solenoid valve that preliminarily adjusts hydraulic pressure. As illustrated in FIG. 2, the controller 50 may control driving of the direct control valve 30 and may adjust the magnitude of the operating pressure by adjusting the degree to which the direct control valve 30 is open.

Here, an operation of the friction element 10 may refer to a state in which the clutch plates 11 and the clutch discs 12 are locked together so that the operating element is engaged by the friction element 10. The operating pressure may refer to hydraulic pressure when the friction element 10 operates.

The oil, the pressure of which has been adjusted by the direct control valve 30, may be supplied to the second supply hole 19c of the friction element 10 through the third hydraulic line 46 and may be introduced into the hydraulic chamber 18 again to apply the operating pressure to the piston 13, thereby operating the friction element 10.

The hydraulic line 40 may be configured to supply, to the friction element 10, the oil that has passed through the pump 20 and the direct control valve 30. For example, as illustrated in FIG. 1, the hydraulic line 40 may include the first hydraulic line 42, the second hydraulic line 44, and the third hydraulic line 46.

The first hydraulic line 42 may be configured to connect an outlet of the pump 20 and the first supply hole 19a. Accordingly, oil pumped by the pump 20 may be supplied to the first supply hole 19a through the first hydraulic line 42 to apply preliminary pressure to the hydraulic chamber 18.

The hydraulic circuit 1 for a transmission may further include a mechanical oil pump 100 configured to supply oil to a lubrication element 80 and a cooled element 90. The lubrication element 80 may refer to a component (such as a bearing, a bush, a gear, or the like) that needs to be lubricated by using oil, and the cooled element 90 may refer to a component (such as an electric motor) that needs to be cooled by using oil. The mechanical oil pump 100 may be connected with the lubrication element 80 through a lubricant line 110 and may be connected with the cooled element 90 through a cooling line 120 branching from the lubricant line 110. Accordingly, oil pumped by the mechanical oil pump 100 may be supplied to the lubrication element 80 and the cooled element 90 through the lubricant line 110 and the cooling line 120.

However, depending on a driving state of a vehicle, there may be lack of oil supplied from the mechanical oil pump 100 to the lubrication element 80 and the cooled element 90. To solve this problem, a manual valve 130 may be coupled to the first hydraulic line 42 to switch a flow path and may be connected with the lubricant line 110 and the cooling line 120 through a connecting line 140. When there is lack of oil supplied from the mechanical oil pump 100 to the lubrication element 80 and the cooled element 90, the manual valve 130 may switch a flow path to route oil passing through the first hydraulic line 42 to the connecting line 140, thereby supplementing the oil supplied from the mechanical oil pump 100 to the lubrication element 80 and the cooled element 90.

The second hydraulic line 44 may be configured to connect the drain hole 19b and the inlet of the direct control valve 30. Accordingly, oil introduced into the hydraulic chamber 18 may be supplied to the direct control valve 30 through the second hydraulic line 44.

The third hydraulic line 46 may be configured to connect the outlet of the direct control valve 30 and the second supply hole 19c. Accordingly, oil, the pressure of which has been adjusted by the direct control valve 30, may be supplied to the second supply hole 19c through the third hydraulic line 46 to apply operating pressure to the hydraulic chamber 18.

The third hydraulic line 46 may be provided with a pressure sensor 150 configured to measure the operating pressure and a relief valve 160 configured to restrict the operating pressure such that the operating pressure becomes lower than a maximum allowable pressure determined in advance.

The pressure sensor 150 may be constituted by a pressure sensor generally used to measure hydraulic pressure. The pressure sensor 150 may measure the pressure of oil passing through the third hydraulic line 46 and may transmit the measured oil pressure to the controller 50.

The relief valve 160 may be constituted by a relief valve generally used to restrict a maximum hydraulic pressure. The relief valve 160 may restrict the maximum operating pressure of oil passing through the third hydraulic line 46 to a maximum allowable pressure to prevent the piston 13 and the other components from being damaged when operating pressure higher than the maximum allowable pressure is applied to the hydraulic chamber 18.

Hereinafter, a method of controlling the hydraulic circuit 1 for a transmission will be described with reference to the drawings.

First, when the controller 50 allows the friction element 10 to stand ready for operation, the controller 50 may apply preliminary pressure to the hydraulic chamber 18 by closing the direct control valve 30 and driving the pump 20. To this end, the controller 50 may control the RPM of the pump 20 such that the pressure of oil pumped by the pump 20 reaches the preliminary pressure.

Next, when the controller 50 operates the friction element 10, the controller 50 may apply operating pressure to the hydraulic chamber 18 by opening the direct control valve 30 and driving the pump 20. To this end, the controller 50 may adjust the RPM of the pump 20 while adjusting the degree to which the direct control valve 30 is open, to allow the pressure of oil adjusted by the direct control valve 30 to reach the operating pressure. Furthermore, the controller 50 may adjust at least one of the RPM of the pump 20 and the degree to which the direct control valve 30 is open, based on a pressure value measured by the pressure sensor 150. That is, the controller 50 may receive an operating pressure change from the pressure sensor 150 in real time and may adjust at least one of the RPM of the pump 20 and the degree to which the direct control valve 30 is open, to allow the operating pressure to have a predetermined pressure value.

As described above, the hydraulic circuit 1 for the transmission may apply the preliminary pressure to the hydraulic chamber 18 of the friction element 10 to maintain the friction element 10 in the standby state in which the friction element 10 is ready to operate, and may then apply the operating pressure to the hydraulic chamber 18 by using the direct control valve 30 to operate the friction element 10.

The hydraulic circuit 1 for a transmission may achieve a reduction in the number of valves required to supply hydraulic pressure to the friction element 10, compared to a hydraulic circuit for a transmission in the related art that controls the pressure of oil to be supplied to a friction element by using a plurality of valves. Accordingly, the hydraulic circuit 1 for the transmission may reduce the amount of oil supplied by the pump 20, valve installation cost, flow loss, and the like.

Furthermore, the hydraulic circuit 1 for the transmission may reduce time necessary for operating the friction element 10 since the hydraulic circuit 1 is capable of maintaining the friction element 1 in a standby state in which the friction element 10 is ready to operate.

Figure 4:
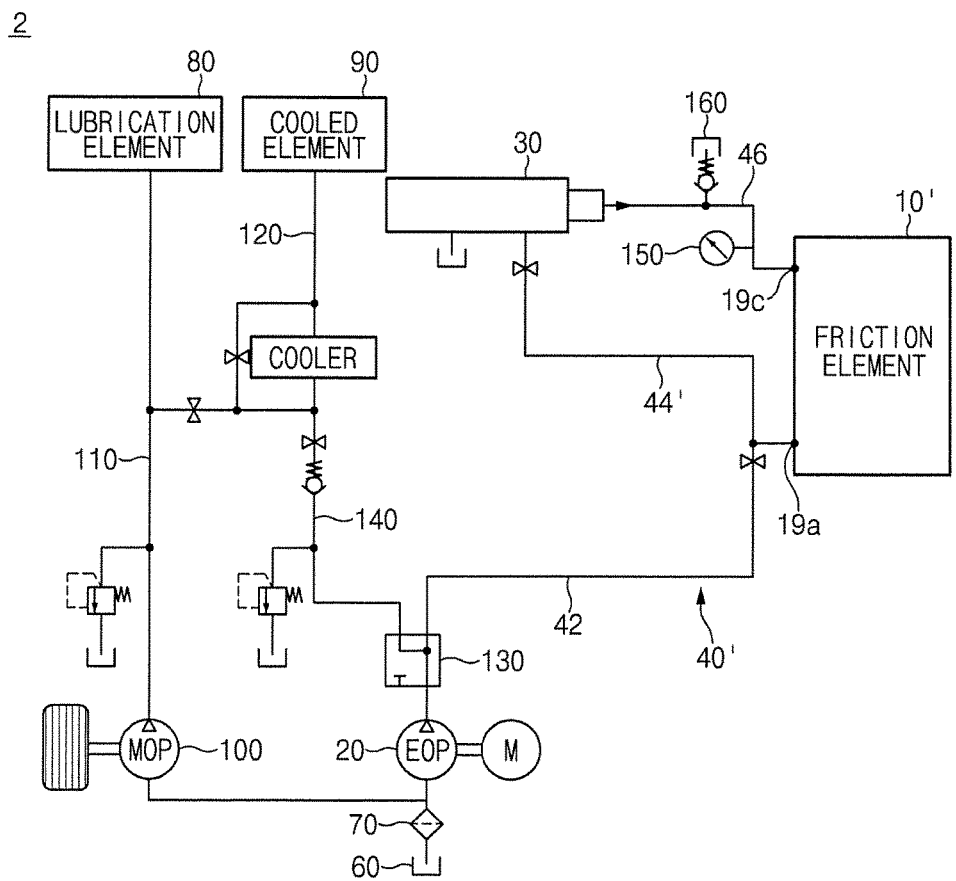
FIG. 4 is a schematic view illustrating a configuration of a hydraulic circuit for a transmission according to a second embodiment of the present disclosure.
Figure 5:
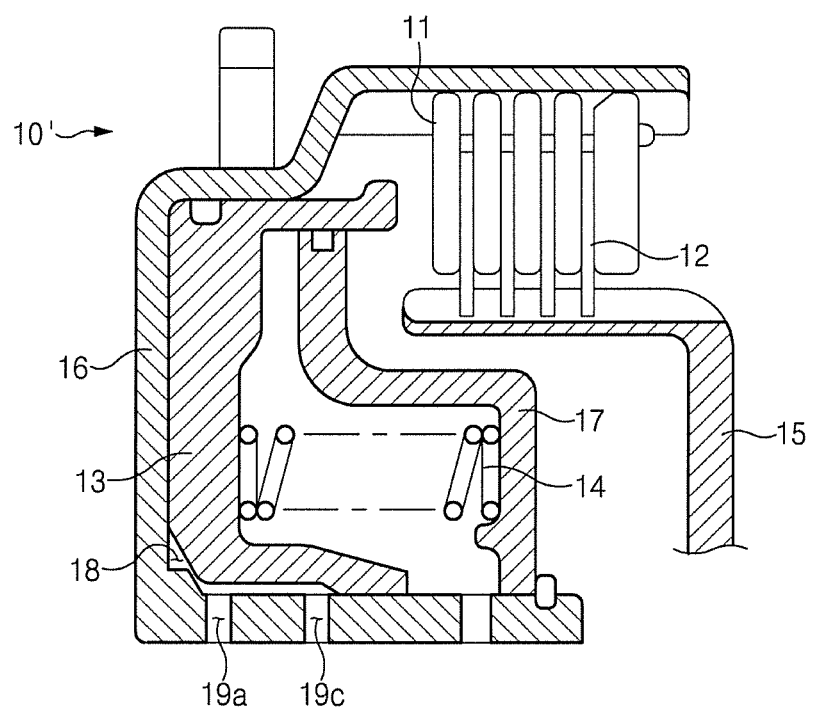
FIG. 5 is a schematic view illustrating a configuration of a friction element illustrated in FIG. 4.

FIG. 4 is a schematic view illustrating a configuration of a hydraulic circuit for a transmission according to a second embodiment of the present disclosure, and FIG. 5 is a schematic view illustrating another exemplary configuration of a friction element compared to the one illustrated in FIG. 3.

A hydraulic circuit 2 for a transmission, according to the second embodiment of the present disclosure, differs from the above-described hydraulic circuit 1 for a transmission in terms of the structure in which the pump 20 and the direct control valve 30 are connected together, and the remaining configuration of the hydraulic circuit 2 is the same as that of the hydraulic circuit 1 for a transmission. The following description of the hydraulic circuit 2 for a transmission will be focused on the difference. Furthermore, identical elements included in both the hydraulic circuit 2 for a transmission and the hydraulic circuit 1 for a transmission described above are provided with identical reference numbers, which have been used in describing the hydraulic circuit 1 for a transmission.

A friction element 10' differs from the above-described friction element 10 in that the friction element 10' includes only the first and second supply holes 19a and 19c but does not include the drain hole 19b, as illustrated in FIGS. 4 and 5.

A hydraulic line 40' differs from the above-described hydraulic line 40 in that a second hydraulic line 44' is directly connected with the first hydraulic line 42, as illustrated in FIG. 4.

The hydraulic circuit 2 for a transmission differs from the above-described hydraulic circuit 1 for a transmission in that oil supplied from the pump 20 is directly supplied to the direct control valve 30 without passing through the hydraulic chamber 18. Likewise to the above-described hydraulic circuit 1 for a transmission, the hydraulic circuit 2 for a transmission may apply preliminary pressure to the hydraulic chamber 18 through the control of the pump 20 and the direct control valve 30 to maintain the friction element 10' in a standby state in which the friction element 10' is ready to operate, or may apply operating pressure to the hydraulic chamber 18 to operate the friction element 10'.

Although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure.

Therefore, exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A hydraulic circuit for a transmission, the hydraulic circuit comprising:
   a friction element configured to engage or disengage an operating element of the transmission;
   a pump configured to pump oil to form preliminary pressure that allows the friction element to be maintained in a standby state in which the friction element is ready to operate; and
   a direct control valve configured to receive the oil that has passed through the pump, the direct control valve adjusting the preliminary pressure to form operating pressure that allows the friction element to operate, when operating the friction element,
   wherein the friction element includes:
   a hydraulic chamber into which the oil is introduced;
   a first supply hole through which the oil that has passed through the pump is supplied to the hydraulic chamber; and
   a second supply hole through which the oil that has passed through the direct control valve is supplied to the hydraulic chamber.

2. The hydraulic circuit of claim 1, further comprising:
   a hydraulic line configured to supply, to the friction element, the oil that has passed through the pump and the oil that has passed through the direct control valve, p1 wherein the hydraulic line includes:
   a first hydraulic line connecting the pump and the first supply hole;
   a second hydraulic line configured to deliver the oil that has passed through the friction element to the direct control valve; and
   a third hydraulic line connecting the direct control valve and the second supply hole.

3. The hydraulic circuit of claim 2, wherein the friction element further includes a drain hole through which the oil introduced into the hydraulic chamber is drained from the hydraulic chamber, and
   wherein the second hydraulic line connects the drain hole and the direct control valve.

4. The hydraulic circuit of claim 2, further comprising:
   a relief valve placed on the third hydraulic line to restrict the operating pressure such that the operating pressure becomes lower than a maximum allowable pressure determined in advance.

5. The hydraulic circuit of claim 1, further comprising:
   a hydraulic line configured to supply, to the friction element, the oil that has passed through the pump and the oil that has passed through the direct control valve,
   wherein the hydraulic line includes:
   a first hydraulic line connecting the pump and the first supply hole;
   a second hydraulic line configured to deliver the oil that has passed through the pump to the direct control valve; and
   a third hydraulic line connecting the direct control valve and the second supply hole.

6. The hydraulic circuit of claim 5, wherein the second hydraulic line connects the first hydraulic line and the direct control valve.

7. The hydraulic circuit of claim 1, further comprising:
   a controller configured to control driving of the pump and the direct control valve,
   wherein the controller closes the direct control valve when allowing the friction element to stand ready for operation and opens the direct control valve to a predetermined opening degree when operating the friction element.

8. The hydraulic circuit of claim 7, further comprising:
   a pressure sensor configured to measure the operating pressure,
   wherein the controller adjusts at least one of an RPM of the pump and a degree to which the direct control valve is open, based on a pressure value measured by the pressure sensor.

9. The hydraulic circuit of claim 7, wherein the direct control valve is a proportional control solenoid valve configured to linearly control the operating pressure.

10. The hydraulic circuit of claim 1, wherein the pump is an electric oil pump.

11. The hydraulic circuit of claim 1, wherein the friction element is either an overdrive clutch or an overdrive brake.

* * * * *